United States Patent [19]

Peterson et al.

[11] 4,244,306
[45] Jan. 13, 1981

[54] MINIMUM TILLAGE PLANTER

[75] Inventors: Charles L. Peterson; Edwin A. Dowding, both of Moscow, Id.

[73] Assignee: Idaho Research Foundation, Inc., Moscow, Id.

[21] Appl. No.: 67,871

[22] Filed: Aug. 20, 1979

Related U.S. Application Data

[63] Continuation of Ser. No. 924,934, Jul. 17, 1978, abandoned.

[51] Int. Cl.³ ............................................. A01C 23/02
[52] U.S. Cl. .......................................... 111/7; 111/52; 111/73; 111/85; 172/177; 172/657; 172/705
[58] Field of Search ..................... 111/1, 6, 7, 73, 85, 111/86, 52, 66, 87; 172/140, 175, 177, 179, 196, 570, 572, 573, 657, 714, 705

[56] References Cited

U.S. PATENT DOCUMENTS

| 139,617 | 6/1873 | Rohmer | 111/85 |
|---|---|---|---|
| 3,170,421 | 2/1965 | Norris et al. | 111/85 |
| 3,745,944 | 7/1973 | Yetter et al. | 172/657 X |
| 3,935,906 | 2/1976 | Neal et al. | 172/177 |
| 4,044,697 | 8/1977 | Swanson | 111/66 |
| 4,048,929 | 9/1977 | Zumbahlen | 111/85 |
| 4,055,126 | 10/1977 | Brown et al. | 111/85 |
| 4,116,139 | 9/1978 | Saur | 111/7 |
| 4,143,718 | 3/1979 | Quanbeck | 172/705 |

FOREIGN PATENT DOCUMENTS

| 817658 | 8/1951 | Fed. Rep. of Germany | 111/1 |
|---|---|---|---|
| 1187179 | 4/1970 | United Kingdom | 111/73 |

OTHER PUBLICATIONS

Young, L. (1976) "New Method May Help Palouse Soil", (News Article from) *Spokesman Review*, Spokane, Washington, Jul. 26, 1976, page unknown.
(Author unknown), *Agricultural Engineering Annual Report* 1976-1977, University of Idaho, Moscow, Idaho, pp. 33 and 34.
(Author unknown), *Agricultural Engineering Annual Report* 1975-1976, University of Idaho, Moscow, Idaho, pp. 33 and 34.
(Author unknown), (Brochure), "International 510 Grain Drill", No. AD-304 27-B1, published by International Harvestor, date unknown.
Peterson, C. L. et al., (1978) "Chisel-Planter, an Experimental Till-Plant Erosion Control System for the Palose", A.S.E.A. Technical Paper No. 78-1015.

*Primary Examiner*—Edgar S. Burr
*Assistant Examiner*—James R. Feyrer
*Attorney, Agent, or Firm*—Wells, St. John & Roberts

[57] ABSTRACT

A planter for seed crops, such as grains. A wheeled framework supports the apparatus for movement about a field. At the front of the framework is a row of transversely spaced chisels which produce tilled areas parallel to the path of movement of the framework and separated from one another by strips of untilled soil. Each chisel carries a roller that breaks up any resulting clods of soil. Liquid fertilizer is directed to the tilled areas by delivery conduits extending along the rear of each chisel to their respective lower ends. The rollers provide a cover of soil to the liquid fertilizer. A drill apparatus is mounted to the framework behind the chisels, with individual openers in longitudinal alignment with the respective chisels for planting seeds in the tilled soil at an elevation above the elevation at which fertilizer has been supplied and without the strips of untilled soil. The seed is therefore located in a tilled furrow with a cover of soil between the seed and the liquid fertilizer to prevent seed damage before germination.

3 Claims, 3 Drawing Figures

4,244,306

MINIMUM TILLAGE PLANTER

RELATED APPLICATION

This is a continuation of U.S. patent application Ser. No. 924,934, filed July 17, 1978, now abandoned.

BACKGROUND OF THE INVENTION

This invention relates to minimum tillage planting of seeds, which is desirable for erosion control as well as planting efficiency. Its usage permits the planting of a field in one pass and without the field preparation normally required when making use of conventional plowing and cultivating methods. The apparatus is designed specifically for use in fields which have been previously cultivated, planted and harvested where the stubble of the earlier crop has been left in the field for erosion control. It permits planting of a field with minimum disturbance of the soil, the seeds being located in tilled furrows separated transversely by strips of untilled soil. Because the apparatus leaves a substantial portion of the field untouched, strips of untilled soil and stubble are alternated with the planted areas to assure better erosion control. This is of particular value in areas where crops such as wheat are grown on side hills. Another advantage of the apparatus is that it does not result in soil movement to one side or ther other, as is the case with moldboard plows. It enables the user to plant seed with a minimum amount of soil disturbance.

More importantly, this apparatus permits planting and fertilizing of a field in a single pass. This is accomplished by a combination of chisels, cover rollers and grain drill components aligned longitudinally on a single framework, together with a fertilizer application system which directs liquid fertilizer to the lower end of each chisel. The end result of each pass of the machine is a tilled furrow having a layer of fertilizer at one elevation, a cover layer of soil, and a layer of seeds at a second elevation above the fertilizer. In this manner, fertilizer is immediately available to the germinating seeds, which have been protected from fertilizer damage or "burning" by the soil cover between the two layers.

Planting machines have been proposed and built which plant seeds in untilled ground. Such "no-till" methods have met with only limited acceptance. A substantial problem has been a toxic affect of the straw or stubble on new plants when seeded directly into the stubble. It appears that some cultivation is desirable for proper new plant growth.

The present apparatus has principal application in the planting of fall or winter wheat, which is planted in the fall and experiences substantial growth the following spring. When a field is fully cultivated before planting of wheat in the fall, the wheat plants do not experience sufficient growth to anchor the surrounding soil during the wet winter and early spring seasons. This is a particular problem where the planted area experiences an accumulation of snow on frozen soil, followed by warm winds and rain. This frequently results in high runoffs on the unprotected soil and substantial erosion damage to the crop and field.

The machine described herein was developed by assimilating several successful practices in growing wheat under such conditions. First, the best conservation tillage practices call for increased use of a chisel plow rather than a moldboard. The chisel plow has the advantage of causing the least soil disturbance, and eliminates the sideward displacement of soil which is a necessary result of using conventional moldboard plows. Secondly, fall application of fertilizer is advocated as a cost effective practice. It provides fertilizer to the germinating plants from the very beginning and increases fall growth of winter wheat. Finally, fluted-feed, end wheel drills are almost universally used in planting wheat in the fields in which these growing conditions are experienced, particularly on hillsides.

From these known practices was developed the minimum tillage planter described herein, specifically for seeding of fall wheat. It is a single pass—from stubble to planted field planter. It is not a "no-till" machine because it has chisel points and packer wheels which break up the soil and clear a path ahead of the planting mechanism. It provides efficient planting and is a significant factor in reducing erosion. Liquid fertilizer is metered into the furrow at the bottom of the chisel points and below the level at which seed is planted. The purpose of the chisel points is not for deep chiseling, but to clear the field residue and help to provide a seed bed.

DESCRIPTION OF THE PREFERRED EMBODIMENT

Figure 1:
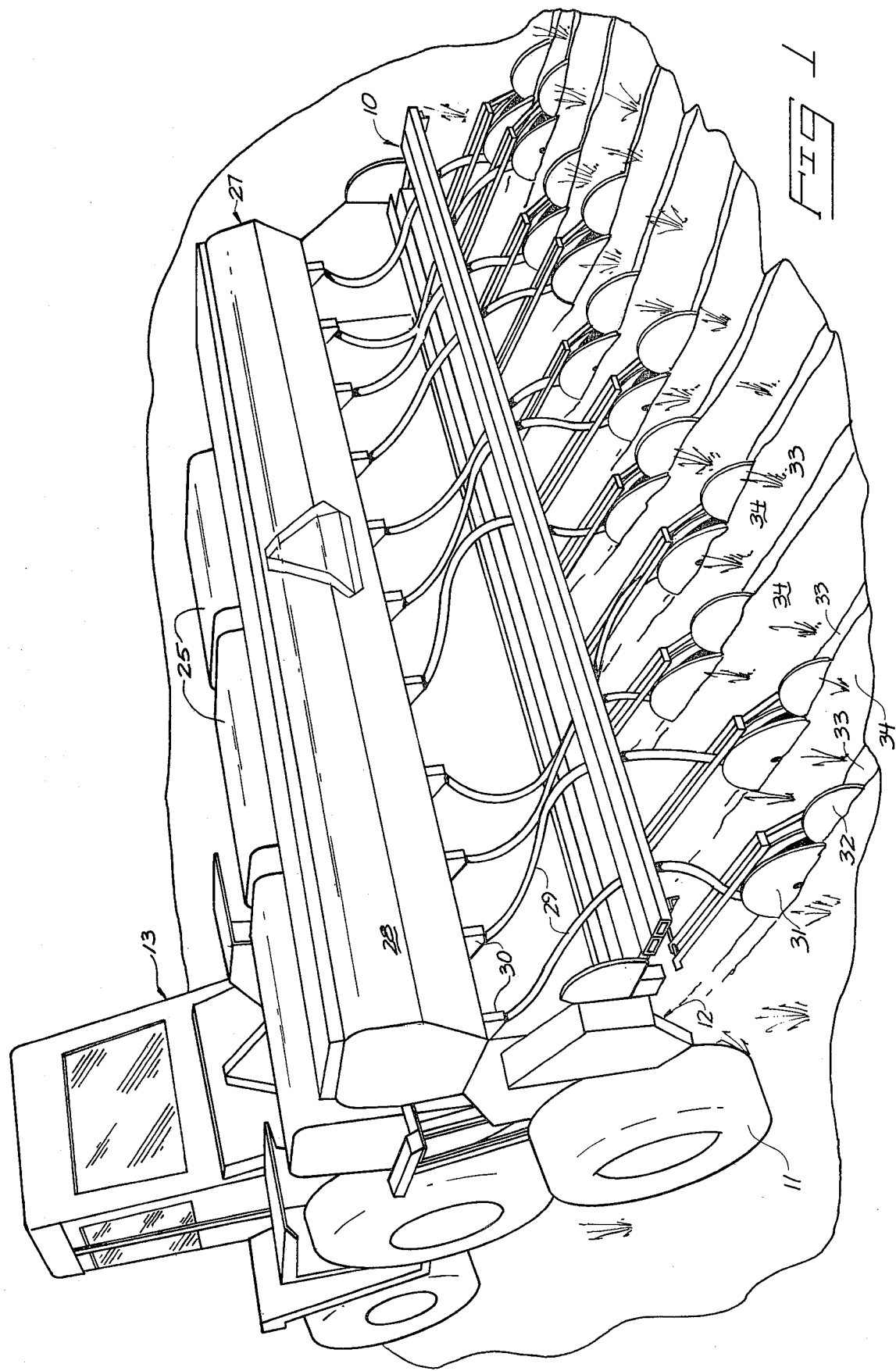
FIG. 1 is a rear perspective view of the planter.

The present apparatus utilizes commercially available equipment in a new combination for effective seeding of land that has previously been harvested. It is designed for use in planting seed crops, particularly grains, in fields containing the stubble left from a prior crop. It is a single pass machine which tills elongated areas of land and places fertilizer and seed along the tilled areas without prior field preparation.

The apparatus basically comprises a supporting framework 10 carried by side wheels 11. The framework 10 is vertically adjustable with respect to the wheels 11 by operation of a cylinder 12 and associated crank assemblies. Such elevational adjustment is conventional in agricultural equipment of this type, such as available seed drills.

The framework 10 is adapted to be drawn about a field by a tractor 13, which is coupled to framework 10 by a conventional hitch assembly. The tractor 13 draws the framework 10 along a suitable longitudinal path along which seed is to be planted.

Mounted across the front of framework 10 are a plurality of chisels. The chisels are spaced transversely from one another and are arranged parallel to the intended direction of movement of framework 10 about the field. They till transversely spaced longitudinal areas arranged parallel to the direction of movement of the framework and separated from one another by strips of untilled soil.

Each chisel comprises a resilient chisel shank 14 connected to framework 10 by a spring mount 15. The spring mount 15, which is conventionally available in a variety of structures, permits rearward yielding of the chisel shank in opposition to a spring force. The lower front surface of the chisel shank 14 has a chisel point 16 fixed to it, which is replaceable as wear is encountered. The details of the chisel are conventional and not further needed for an understanding of the present assembly.

Figure 2:
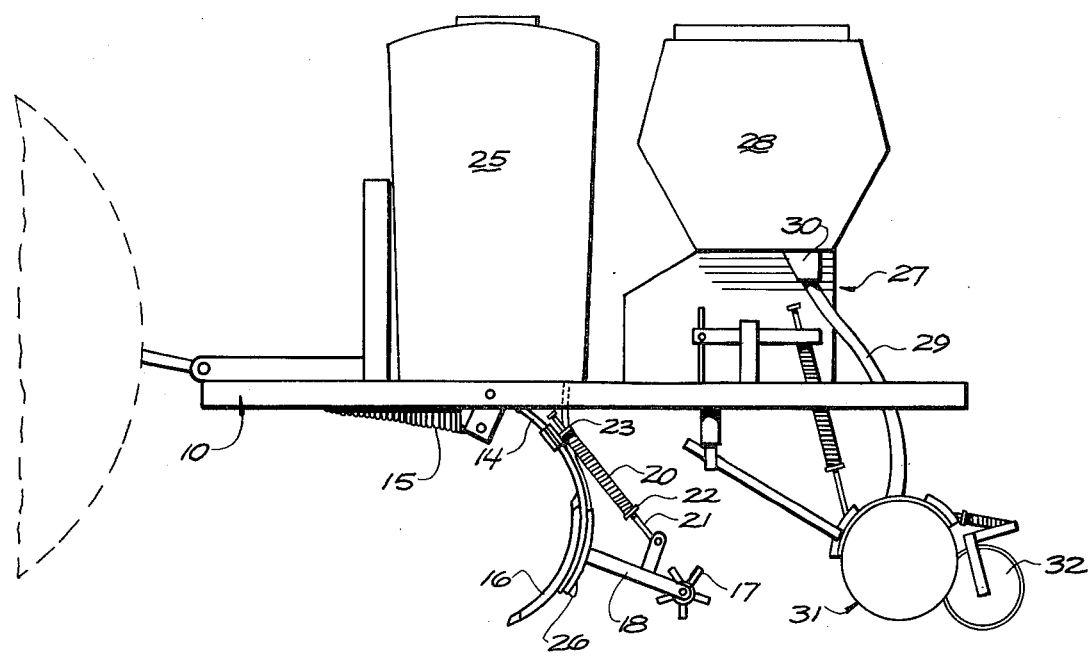
FIG. 2 is a longitudinal sectional view taken alongside the operative elements of the planter shown in FIG. 1.
Figure 3:
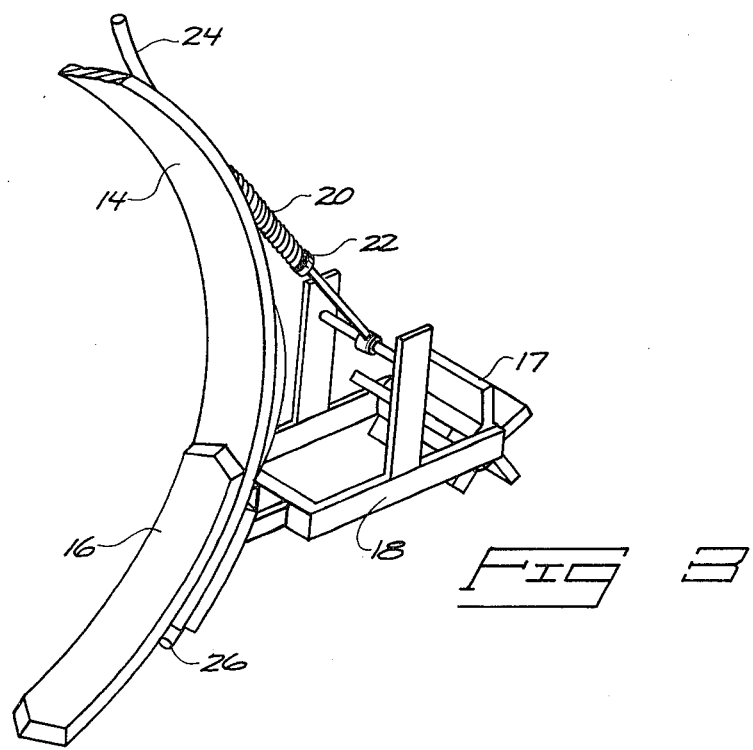
FIG. 3 is an enlarged perspective view of the chisel assembly.

As the chisels move through the soil, they dig a furrow, lifting the soil along the forward arcuate surfaces of the chisel point and shank 16, 14. Depending upon field conditions, this results in the formation of clods of soil at the surface. Accordingly to this apparatus, the clods are broken by a fluted roller 17 rotatably mounted directly rearward of each chisel. The fluted rollers 17 comprise a cylindrical drum with radiating transverse fins. The drum and fins are freely rotatable on a mounting frame 18 that is pivotably connected to the rear of the chisel shank 14 on which it is mounted. The frame 18 is free to pivot about the transverse axis of its connection at the chisel shank 14. It is urged downwardly (counterclockwise in FIG. 2 and 3) by a compression spring 20 that surrounds an upright shaft 21. The lower end of shaft 21 is pivotally connected to frame 18. Its upper end slides freely through a bracket 23 fixed to the rear of chisel shank 14. Spring 20 is compressed between bracket 23 and a collar 22 surrounding and fixed to the lower portion of shaft 21. The compression spring 20 therefore exerts a downward force on the frame 18 and roller 17 to maintain the roller 17 in yieldable engagement with the soil through which the chisel has just passed.

Liquid fertilizer is directed to the tilled soil from storage tanks 25 on framework 10. Conventional fertilizer supply conduits 24 lead from inlets at tank 25 to individual outlets 26 located adjacent the lower end of each chisel point 16. The control and delivery of the liquid fertilizer is accomplished by conventional mechanisms. The path of each conduit 24 extends along the rear of the chisel shank 14 and point 16 with which it is associated. In this manner, liquid fertilizer is directed to the bottom of the furrow created by passage of the chisel at a first elevation within each tilled area.

The outlet of the fertilizer distributing conduit 24 is located immediately rearward of the chisel and forward of the following fluted roller 17. As the roller 17 passes over the area which has been tilled, it causes some of the loosened soil to fall back into the furrow, providing a compacted soil cover above the fertilizer. This is important in order to allow use of liquid fertilizer without possibly damaging the seed placed within the soil, which could be destroyed by direct contact with the fertilizer substance.

Drill means is provided on framework 10 rearward of the chisels and in longitudinal alignment with them. The drill means is adapted to plant seeds within a seed-receiving trench along each tilled area at a depth less than the depth at which the fertilizer has been applied. The drill means accomplishes this without disturbing the strips of untilled soil between the areas which were tilled by the passage of the chisels.

The drill 27 basically comprises conventional components used for planting seeds, and particularly for planting fields of grain. It includes a seen bin 28 having a powered feed mechanism 30 which directs metered amounts of seeds to delivery tubes 29. The lower end of each tube 29 is located within a pair of forwardly converging disks which comprise a conventional double disk opener. A packer wheel 32 is located immediately rearward of the double disk opener. It serves to compress soil above the seed and also acts as a depth gauge for the opener 31. These planting elements are conventional and well known in seed drills, and no further detailed description is believed to be necessary.

The depth at which the drill 27 plants the seed is at an elevation above that at which the fertilizer is applied by means of conduits 24. Thus, the apparatus, in a single pass, creates transversely spaced longitudinal furrows or tilled areas which alternate with untilled areas containing stubble or other crop residues. Referring to FIG. 1, the relatively narrow tilled areas are shown at 33 and the intervening untilled areas are shown at 34.

Within each tilled area 33 there is a layer of fertilizer, a cover layer of soil, and a layer of seeds, again covered by soil. This layering of the fertilizer and seeds in the narrow furrows is a unique planting arrangement which facilitates germination and early growth of the plants, and minimizes field erosion. The apparatus effectively places both fertilizer and seeds in contained amounts of tilled soil. This eliminates any growing damage due to contact of the young plants with stubble or other field residues. It also maintains the bulk of the field area intact and undisturbed for erosion control. This is of particular value when planting winter wheat in the fall, since this procedure eliminates the difficulties encountered by fully cultivating a field area and exposing it to winter weather and spring rains without mature plant growth being available.

Having described our invention, we claim:

1. A minimum tillage planter for use in unplowed fields, comprising:

a wheeled supporting framework adapted for movement about a field;

a plurality of transversely spaced spring tooth chisel plows each including a yieldable support having a forward arcuate surface depending downward from the framework, whereby movement imparted to the chisel plows by the framework results in the digging of furrows as loosened soil is lifted along the forward arcuate surfaces of the chisel plows as they move through the soil along transversely spaced areas separated by strips of untilled soil;

a liquid fertilizer tank mounted on said framework;

fertilizer conduit means having an inlet operatively connected to said liquid fertilizer tank and having a plurality of outlets located respectively adjacent the lower end of each chisel plow for selectively directing liquid fertilizer to the furrow dug thereby as the chisel plows move through the soil;

a plurality of narrow fluted rollers;

a pivoted frame mounted individually to each spring tooth chisel plow and extending rearwardly therefrom, each frame being individually mounted to a yieldable support for a chisel plow for free pivotal movement about a horizontal transverse axis;

bearing means on each frame rotatably mounting one narrow fluted roller at an elevation above the lower end of the chisel plow to which the frame is mounted, said bearing means rotatably supporting each roller about a horizontal transverse axis on said frame;

individual means operatively connected between the supporting framework and each frame for yieldably urging the frame downwardly relative to the chisel plow to which the frame is mounted for maintaining each roller in yieldable engagement with the soil through which the chisel plows have just passed, to thereby break up resulting clods of soil immediately behind each chisel plow and to cause some of the loosened soil along each furrow to fall back into the furrow and provide a compacted soil cover above the fertilizer therein;

an individual drill means mounted to the framework at a location rearward of each chisel plow and roller, each drill means being in longitudinal alignment with an individual chisel plow and roller for planting of seed along each furrow at an elevation above that of the outlets of said fertilizer conduit means;

whereby fertilizer and seed is placed along each furrow at differing elevations without disturbing the strips of untilled soil to each side of the furrows.

2. A minimum tillage planter for use in unplowed fields, comprising:

a framework;

wheel means on said framework for supporting it above transversely spaced chisel plow means mounted on said framework for digging individual furrows extending parallel to said path, said furrows being separated by adjacent strips of untilled soil;

each of said chisel plow means comprising:
 (a) a transversely narrow spring tooth chisel shank having front and rear arcuate surfaces curving downward and forward from the framework; and
 (b) a chisel point mounted to the lower front surface of the shank;

liquid fertilizer storage means on said framework;

fertilizer delivery means extending downwardly along the rear surface of each chisel shank for directing fertilizer from said storage means to the soil within each furrow at a location adjacent the lower end of the chisel point associated therewith;

a plurality of narrow fluted rollers;

a pivoted frame mounted individually to each chisel shank about a transverse horizontal axis and extending rearwardly from the shank;

bearing means on said frame for mounting one narrow fluted roller rearwardly adjacent to each chisel shank in longitudinal alignment therewith, each roller being rotatably mounted to its suporting frame about a horizontal transverse axis and presenting a plurality of transverse radial vanes for engaging and breaking of clods of soil left along each furrow by passage of the chisel shank and point and for partially filling the tiled area immediately rearward of said chisel shank and point;

individual spring means operatively connected between the supporting framework and each frame for yieldably urging the frame downwardly relative to the chisel plow to which the frame is mounted for maintaining each roller in yieldable engagement with the soil through which the chisel plows have just passed, thereby providing a compacted soil cover above the fertilizer;

seed storage means on said framework;

longitudinal disk opener means on said framework individually aligned behind each chisel shank and roller for opening a seed-receiving trench in the compacted soil within each furrow at a depth less than the depth at which fertilizer is directed by said fertilizer delivery means;

and seed delivery means on said framework operatively connected between the seed storage means and said disk opener means for directing seed into the seed-receiving trench produced by the disk opener means;

whereby fertilizer and seed is placed along each furrow at differing elevations without disturbing the strips of untilled soil to each side of the furrows.

3. A planter as set out is claim 2 wherein each roller comprises:

a transverse cylinder;

a plurality of transverse radial vanes extending across the width of the cylinder and projecting outwardly therefrom.

* * * * *